ســ

3,372,035
STABILIZED ICE CREAM COMPOSITIONS
Charles R. W. Morison, Ossining, N.Y., and Rosemary E. Weisse, Danbury, Conn., assignors to Union Carbide Corporation, a corporation of New York
No Drawing. Filed Aug. 14, 1964, Ser. No. 389,803
4 Claims. (Cl. 99—136)

ABSTRACT OF THE DISCLOSURE

Frozen milk products such as ice cream are stabilized by incorporation therein of a small amount of water soluble hydroxyethyl cellulose. The hydroxyethyl cellulose serves to impart good whipping characteristics and to prevent ice crystal growth and the resulting stabilized product possesses adequate body, smooth texture, and a long storage life.

---

This invention relates to stabilized frozen milk products, particularly to ice cream compositions, confectionery frozen milk compositions and the like.

In the manufacture of ice cream, it is commonplace to include in the composition a stabilizing and thickening agent. One purpose of this stabilizer is to provide good whipping characteristics which impart desirable body and smooth texture to the ice cream and to maintain a stable foamy mixture of minute bubbles and very fine ice crystals. During manufacture, the stabilizers assist in the introduction of very small bubbles of air resulting from agitation to produce an ice cream product having a high degree of "overrun." Overrun represents a measure of the relationship between the volume of the final ice cream product obtained by incorporating air into the mixture during preparation, and the original volume of the unstirred ingredients. The overrun is measured by percentage as a ratio between the increase in volume of the final product and the original volume of the ingredients as the mixture. A overrun in the neighborhood of 100 percent is highly desirable.

The second function of the stabilizer or thickening agent in ice cream compositions is to prevent ice crystal growth which will occur in unstabilized ice cream after storage. Such crystal growth is commonly encountered in ice cream prepared in the home and can become appreciable in such products, if under unusual circumstances, the ice cream remains unconsumed for longer than from several days to several weeks. This disadvantage, though tolerable and often appreciated as a characteristic of a homemade recipe, detracts appreciably from the esculent appeal and saleability of the commercial product where storage is often prolonged between the time of manufacture and between the time of sale and ultimate consumption.

Gelatine has been widely used for its stabilizing value but it is particularly sensitive to microbe attack and requires special dissolving techniques since the mix must be aged for a time after the addition of the gelatine and prior to freezing. The water soluble alginates have also been employed but these are also extremely susceptible to bacterial decomposition, and present additional mixing problems since they are not compatible with the calcium salts present in milk.

More recently, various cellulose ethers have been suggested for use as ice cream stabilizers. However, problems also have accompanied the attempts to adapt these compounds to ice cream formulations. For example, the water insolubility of hydroxymethyl cellulose has made its use impractical. Methyl cellulose offered some beneficial stabilizing properties, but being insoluble in hot water, tended to come out of solution if any heat stabilization of the mixture were attempted. Carboxymethyl cellulose has also been employed, but since it is precipitated by the calcium cation an additional stabilizer was required.

According to the present invention it has been found that a homogeneous and palatable ice cream product having a long storage life and a high overrun may be obtained by incorporation of a stabilizing amount of water soluble hydroxyethyl cellulose. Moreover, since hydroxyethyl cellulose is soluble in both hot and cold water, and is compatible with calcium salts many of the processing disadvantages which accompany the use of prior art stabilizers are unencountered.

The hydroxyethyl cellulose is employed in ice cream compositions in a stabilizing amount sufficient to impart good whipping characteristics and to prevent ice crystal growth. Amounts of hydroxyethyl cellulose of less than 1 percent by weight based upon the entire composition are effective. In general, the stabilizer will comprise from about 0.01 to about 1.0 percent of the composition by weight.

The hydroxyethyl cellulose may be introduced into the ice cream mix by simple addition to the other ingredients after they have been mixed and prior to homogenization of the mix. However, the capability of hydroxyethyl cellulose to remain soluble at both high and low temperatures greatly facilitates its introduction at any stage of manufacture and permits a latitude in ice cream preparation not heretofore available with other stabilizers.

Ordinarily ice cream mixes are prepared by initially subjecting the mixture of ingredients to a pasteurization procedure accomplished by heating the mixture to a temperature in the vicinity of 150 to 160° F. at which time the stabilizer may be added. The mixture is maintained at this temperature for a short time, following which it is homogenized usually under pressure. The mix is then cooled, for example, by allowing it to flow over a cooling surface such as a rotary drum, and is thereafter frozen. It is important that the freezing be fairly rapid in order to obtain a product of uniform texture. More modern methods have employed continuous ice cream freezers which mechanically mix premeasured amounts of the ingredients with air and are able to produce a smooth textured cream in an essentially "one step" operation. The hydroxyethyl cellulose stabilizer of the instant invention is adaptable to ice cream compositions produced by any of these methods.

Hydroxyethyl cellulose is available in a range of different grades having varying molecular weights measured as the viscosity of a hydroxyethyl cellulose solution in water. The hydroxyethyl cellulose useful as a stabilizer in ice cream compositions according to the instant invention may possess a viscosity varying over a broad range. Measured as a 2 percent aqueous solution at 20° C. in water, the viscosity may be as low as about 10 centipoises and as high as 5000 centipoises. Use of a higher molecular weight hydroxyethyl cellulose imparts body to the ice cream product and helps maintain its solidity at ordinary dispensing temperatures. In addition, such products are characterized by their stability over very long periods of time without appreciable ice crystal growth. On the other hand, use of a lower molecular weight hydroxyethyl cellulose appears to give a product of slightly superior overrun.

Although the stabilized products of this invention have been discussed with prime relation to ice cream, the stabilizer of this invention may be employed in other frozen milk products and such will be obvious to the skilled artisan from this disclosure. An average ice cream composition contains by weight about 12.5 percent fat, 15 percent nonfat milk solids, 15 percent sugar and the stabilizer with the possible inclusion of minor amounts of salt, egg solids, and of course flavoring. Milk sherbets, or "frozen milk" are the particular frozen products made from milk products, sugar and water with the addition of flavoring and stabilizer.

To illustrate the effectiveness of hydroxyethyl cellulose as a stabilizer for ice cream a group of experimental ice cream samples were prepared employing the following ingredients in the basic recipe:

| | Weight in grams |
|---|---|
| Water | 57 |
| Cream | 932 |
| Sugar | 199 |
| Vanilla | 7 |
| Salt | 0.5 |

The ingredients were blended and the stabilizer added after which mixing was continued for 30 minutes. Mixing equipment available was not of the commercial type but treatment approximated a commercial preparation. The mixtures were homogenized and their temperature lowered to 20 to 25° F. After approximately 30 minutes at this temperature, the thickened aerated mixture was packed overnight at a temperature of 5° F. The quality of each pack of ice cream was determined by empirical methods about 24 hours after mixing and at regular weekly intervals thereafter.

TABLE

| Experiment No. | Stabilizer | Texture [1] at 0° F., 24 Hours | Overrun [2] percent, 24 Hours | Stability in days, 20° F. | Crystal Formation |
|---|---|---|---|---|---|
| 1 | None | 45 | 45 | | Medium-Large. |
| 2 | Gelatine | 75 | 90 | 5 | Small. |
| 3 | Hydroxyethyl Cellulose A [3] | 85 | 100 | 22 | Do. |
| 4 | Carboxymethyl Cellulose | 70 | 50 | 5 | Medium-Large. |
| 5 | Methyl Cellulose | 80 | 85 | 6 | Medium. |
| 6 | Hydroxyethyl Cellulose B [4] | 85 | 90 | 6 | Do. |
| 7 | Hydoxyethyl Cellulose C [5] | 85 | 90 | 60 | Small-Medium. |

[1] Smoothness and pleasantness to taste, based on high grade commercial brand purchased for comparison rated at 100.
[2] Increase in final volume over original volume.
[3] Hydroxyethyl cellulose having a viscosity of 8 to 10 centipoises measured as a 2 percent aqueous solution at 20° C.
[4] Hydroxyethyl cellulose having a viscosity of 3,500 to 5,000 centipoises measured as a 2 percent aqueous solution at 20° C.
[5] Hydroxyethyl cellulose B which was subjected to treatment to improve ease of solution.

What is claimed is:

1. A stabilized ice cream composition containing as the sole stabilizing agent therein a stabilizing amount of hydroxyethyl cellulose.

2. A stabilized ice cream composition containing as the sole stabilizing agent therein from about 0.1 to about 1.0 percent by weight of hydroxethyl cellulose.

3. The composition of claim 2 wherein the hydroxyethyl cellulose has a viscosity measured as a 2 percent aqueous solution in water at 20° C. of about 10 to 5000 centipoises.

4. A method of stabilizing ice cream compositions to obtain good whipping characterictics and to prevent ice crystal growth which comprises incorporating in the composition as the sole stabilizing agent a stabilizing amount of hydroxyethyl cellulose.

References Cited

UNITED STATES PATENTS 2,604,406   7/1952   Blihovde _____ 99—136
3,076,709   2/1963   Rivache _____ 99—54

A. LOUIS MONACELL, *Primary Examiner.*

J. M. HUNTER, *Assistant Examiner.*